(12) United States Patent
Segsworth et al.

(10) Patent No.: US 9,823,433 B2
(45) Date of Patent: Nov. 21, 2017

(54) STAGGERED OPTICAL FIBER SPLICES

(71) Applicant: PGS Geophysical AS, Oslo (NO)

(72) Inventors: Matthew Segsworth, Austin, TX (US); Jeremy Smith, Austin, TX (US); Robert Alexis Peregrin Fernihough, Austin, TX (US); Jeff Bowlus, Austin, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/169,105

(22) Filed: May 31, 2016

(65) Prior Publication Data

US 2017/0038551 A1    Feb. 9, 2017

Related U.S. Application Data

(60) Provisional application No. 62/202,260, filed on Aug. 7, 2015.

(51) Int. Cl.
*G02B 6/255* (2006.01)
*G02B 6/50* (2006.01)
*G02B 6/44* (2006.01)

(52) U.S. Cl.
CPC ........... *G02B 6/506* (2013.01); *G02B 6/2558* (2013.01); *G02B 6/4427* (2013.01); *G02B 6/4429* (2013.01)

(58) Field of Classification Search
CPC ..... G02B 6/506; G02B 6/2558; G02B 6/4434
USPC ........................................................ 385/99
See application file for complete search history.

(56) References Cited

U.S. PATENT DOCUMENTS

| 2012/0189256 A1* | 7/2012 | Allen ....................... G02B 6/44 385/112 |
| 2015/0153530 A1* | 6/2015 | Kordahi ............... G02B 6/4427 385/101 |
| 2015/0234143 A1 | 8/2015 | Smith et al. |

OTHER PUBLICATIONS

Finishadapt, LLC, "FinishAdapt 154 Pinless Mini Range Fusion Splice Protector Sleeve", http://www.finishadapt.com/docs/154-range.pdf (accessed May 31, 2016), published at least as early as 2009 (according to "archive.org/web/").

* cited by examiner

*Primary Examiner* — Jerry Blevins (57) ABSTRACT

Staggered Splices. At least some illustrative embodiments are apparatus including a tube having a wall defining an interior volume, first and second optical fibers disposed within the interior volume and the first and second optical fibers joined at a first splice. Also included are third and fourth optical fibers disposed within the interior volume, the third and fourth optical fibers joined at a second splice. The first splice and the second splice have an axially spaced-apart relationship within the interior volume of the tube.

17 Claims, 7 Drawing Sheets

STAGGERED OPTICAL FIBER SPLICES

CROSS-REFERENCE TO RELATED APPLICATIONS

This application claims the benefit of U.S. Provisional Application Ser. No. 62/202,260 filed Aug. 7, 2015 and titled "Staggered Optical Fiber Splices". The provisional applications are incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., ocean, large lakes). Marine geophysical survey systems may use a plurality of sensor cables, which contain one or more sensors to detect acoustic energy emitted by one or more sources and returned from a hydrocarbon reservoir and/or associated subsurface formations beneath the sea floor. Sensor cables, in some embodiments may comprise sensor streamers which may be towed through a water body by a survey vessel, and in other embodiments ocean bottom cables disposed on the sea floor or entrenched within the seabed.

In embodiments deployed on the sea floor or entrenched in the seabed, which may be referred to as permanent reservoir monitoring (PRM) systems, there can be water exposure for relatively long periods of time (e.g., months or years). For example, PRM systems may be designed for decades of operation in ultra-deep water (e.g., greater than 1500 m), while also remaining suitable for use at shallower depths. In such subsea applications based on optically-powered sensors and optical telemetry, conventional wisdom dictates the use of gel-filled stainless steel conduits for the optical fibers with robust hermetic seals at every connection and each of the sensor splices, which typically number in the hundreds and possibly the thousands. Each seal represents a cost and a potential failure location. Thus, mechanisms to reduce the need for such seals would be advantageous.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical and/or power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Substantially uniform" shall mean, in the context of a physical quantity, that the quantity is constant or unchanging to within the generally accepted practice for measuring such quantity in the relevant art.

"About" shall mean, when used in conjunction with a non-integer numerical value, ±10%.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Figure 1:
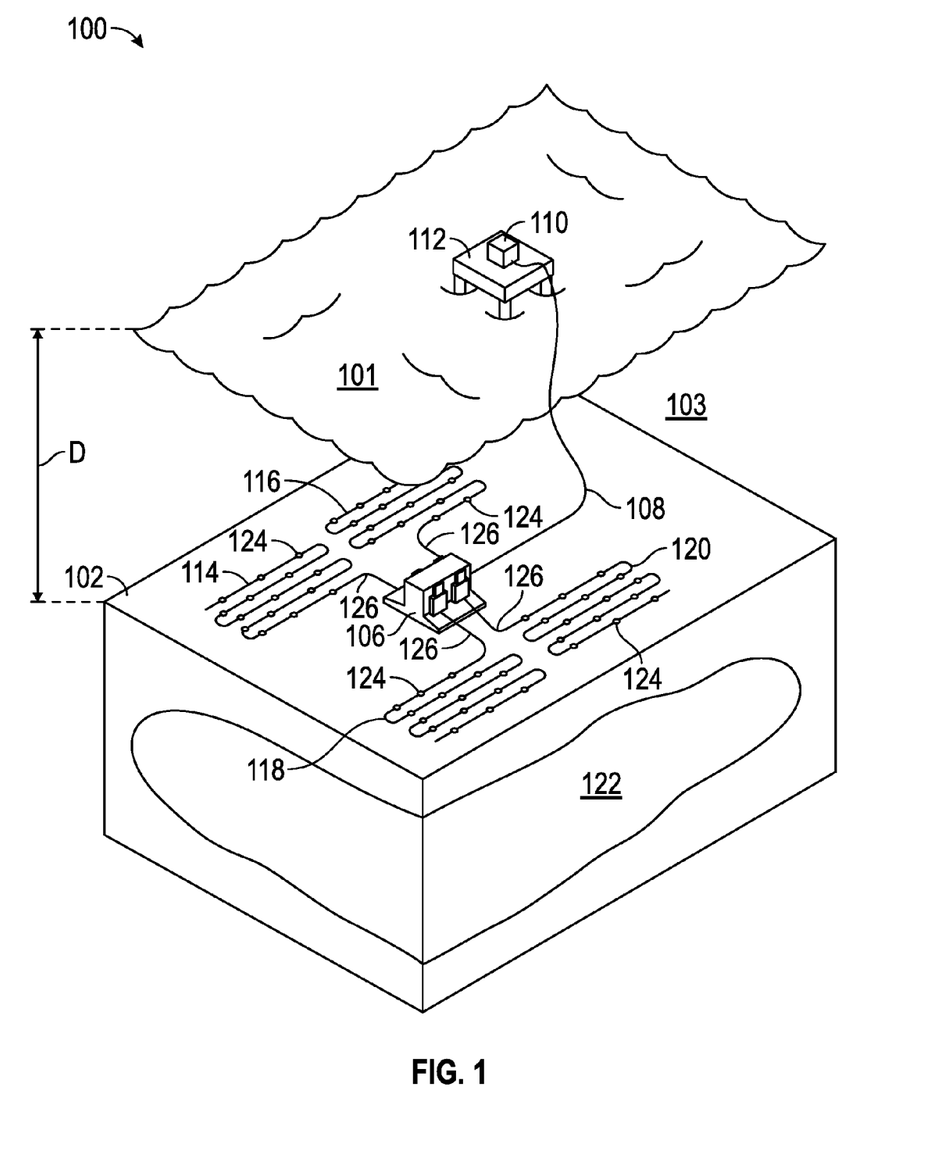
FIG. 1 shows a partial cutaway perspective view of a marine geophysical survey environment in accordance with at least some embodiments.

FIG. 1 shows a perspective cut-away view of a portion of a marine geophysical survey environment 100. Marine geophysical survey environment 100 may be used in conjunction with the exemplary cable embodiments described hereinbelow. FIG. 1 shows the surface 101 of the water. At a distance D below the surface 101 resides the sea floor 102, and below the sea floor 102 resides a hydrocarbon reservoir 122.

Within the environment of FIG. 1 a base unit 106 may be installed on sea floor 102 which mechanically and communicatively couples to an umbilical cable 108 that extends from the base unit 106 to a computer system 110 at the surface. Umbilical cable 108 may comprise an optical fiber link to computer system 110, or an optical fiber link and/or an electronic communication link. In the example system of FIG. 1, the computer system 110 may reside on a vessel 112 floating on the surface 101 of water body 103. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables 114, 116, 118 and 120 are communicatively coupled to the computer system 110.

Each of sensor cables 114, 116, 118 and 120 comprise a plurality of seismic sensors 124. For ease of illustration only fifteen seismic sensors 124 are shown associated with sensor cables 114, for example. However, in practice many hundreds or thousands of such devices may be spaced along the sensor cable 114. By way of example, sensors 124 may be spaced along a sensor cable 114 at intervals of about 50 meters. Further, in at least some embodiments, the spacing of sensors 124 may be in the range from 25 meters to 250 meters. However, the seismic sensors 124 need not, be evenly spaced along the sensor cables, and extended portions of the sensor cables may be without seismic devices. For example, lead-in portions 126 may have expanses within which no seismic sensors are located. Each seismic sensor 124 may comprise a particle motion sensor and an acoustic pressure sensor, or hydrophone, or both. Further, in at least some embodiments, a particle motion sensor may detect particle motions of the seabed along multiple directions, or axes. For example, at least some particle motion sensors may comprise so-called three-component, or three-axis particle motion sensors which detect particle motions along three, typically mutually-orthogonal, directions or axes. In at least some embodiments, seismic sensors 124 may be optically-based devices in which optical power supplied to the sensor via a corresponding one of sensor cables 114, 116, 118 and 120 is modulated by the sensor in response to a seismic acoustic wavefield, e.g. particle motion of the sea bed 102 or acoustic pressure as the case may be, and returned to the vessel 112 via a sensor cable 114, 116, 118 and 120 and umbilical cable 108.

Figure 2:
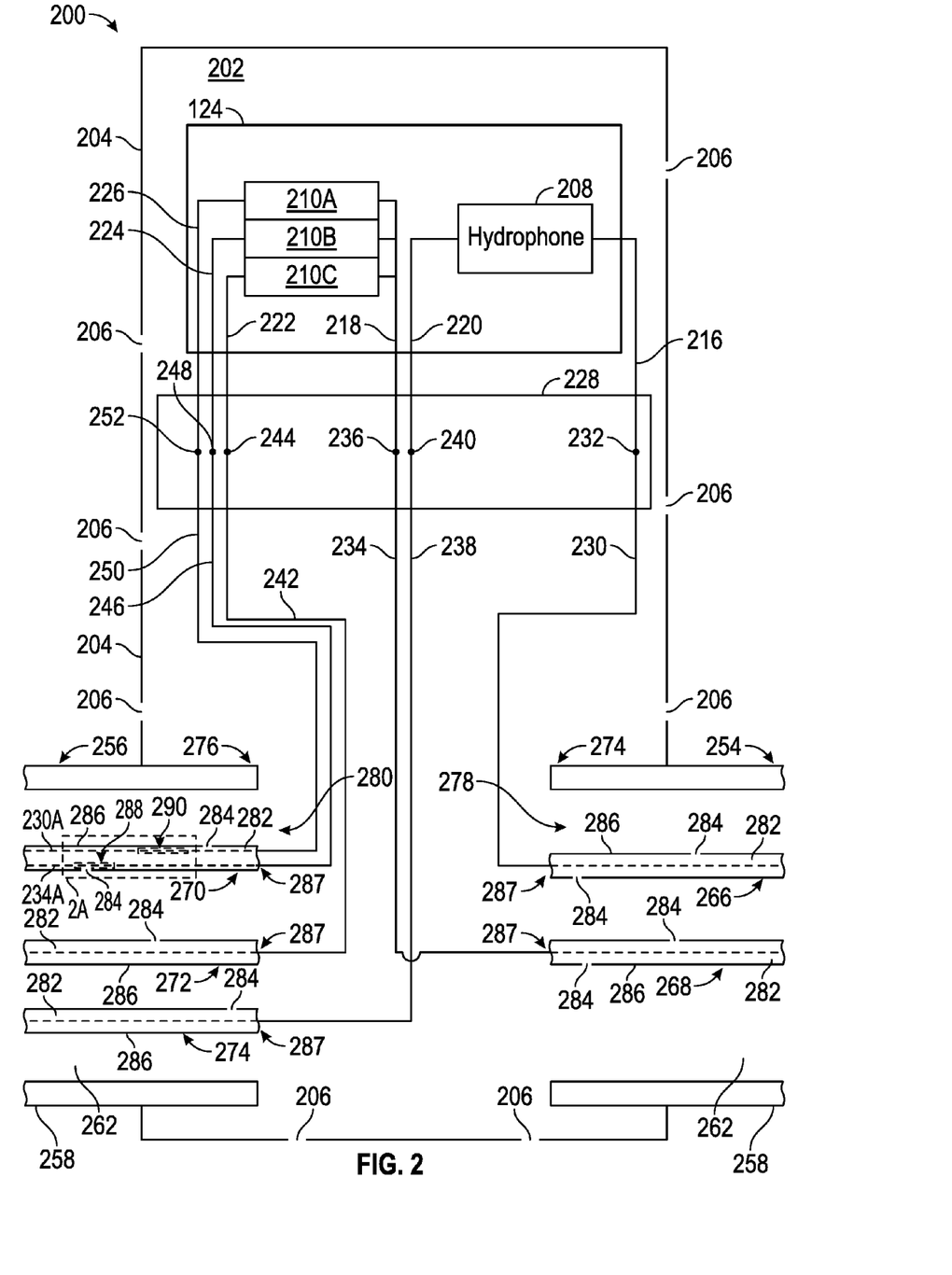
FIG. 2 shows a sensor module in accordance with at least some embodiments.

The coupling of seismic sensors to a sensor cable may be further understood by referring now to FIG. 2 showing a sensor module 200 in accordance with at least some embodiments. Sensor module 200 includes seismic sensor 124 disposed within interior volume 202 of an outer shell 204. As described further below, outer shell 204 may, when deployed within water body 103, admit sea water into interior volume 202 through, for example, ports 206 in outer shell 204. In other words, the outer shell may not be watertight and when sensor module 200 is submerged in a water body 103, such as an ocean, sea water may flood interior volume 202 by entering through ports 206 in outer shell 204. Although eight ports 206 are shown for purposes of illustration, any suitable number of ports may be 206 in various embodiments of sensor module 200. In the exemplary embodiment in FIG. 2, seismic sensor 124 includes a hydrophone 208, and particle motion sensors 210A, B and C each of which may be sensitive to particle motions in one of three substantially mutually-orthogonal directions. Stated otherwise, particle motion sensors 210A-C together form a 3-axis particle motion sensor. Any suitable technology sensitive to particle motion may be used in conjunction with particle motion sensors 210A-C, such as geophones or accelerometers, for example.

As previously described, seismic sensors 124 may be optically-based devices. Thus, in at least some embodiments, optical power may be supplied to a seismic sensor 124 via optical fibers such as optical fiber 216 coupled to hydrophone 208 and optical fiber 218 coupled to particle motion sensors 210A-C. Optical power conveyed on optical fiber 218 may be split before being input to particle motion sensors 210A-C, however, for ease of illustration optical devices which may be used therefor are not shown in FIG. 2. Optical signals bearing seismic data output by hydrophone 208 and particle motion detectors 210A-C are conveyed on corresponding ones of optical fibers 220, 222, 224 and 226.

Optical fibers 216-226 may be coupled to sensor cables to receive optical power from a base unit 106 or vessel 112, say, and return optical signals from seismic sensor 124 thereto. By way of example, optical fibers 216-226 may be spliced to optical fibers within a sensor cable at a splice pad 228. As would be appreciated by those skilled in the art having the benefit of the disclosure, a splice between optical fibers may comprise a welding or fusing together of the optical fibers. Thus, in the exemplary embodiment of a sensor module 200 in FIG. 2, optical fiber 216 is spliced to optical fiber 230 at splice 232. Similarly, optical fiber 218 is spliced to optical fiber 234 at splice 236, optical fiber 220 is spliced to optical fiber 238 at splice 240, optical fiber 222 is spliced to optical fiber 242 at splice 244, optical fiber 224 is spliced to optical fiber 246 at splice 248, and optical fiber 226 is spliced to optical fiber 250 at splice 252.

Optical fibers 230, 234, 238, 242, 246, and 250 may be contained within respective segments of a sensor cable. Thus, for example, optical fibers 230 and 234 may be contained within sensor cable segment 254. Similarly, optical fibers 238, 242, 246 and 250 may be contained within sensor cable segment 256. Further, each sensor cable segment may comprise an outer jacket, for example outer jacket 258 of sensor cable segments 254 and 256. Optical fibers within a sensor cable segment may be disposed within a conduit that itself is disposed within an interior volume of the sensor cable segments. The interior volume is defined by the outer jacket of the sensor cable segment. Thus, outer jacket 258 of sensor cable segment 254 and 256 define an interior volume 262 of each sensor cable segment. In the example sensor cable segment 254, conduit 266 disposed within interior volume 262 carries optical fiber 230 and conduit 268 carries optical fiber 234. Similarly conduits 272 and 274 disposed within interior volume 262 of sensor cable segment 256 carry optical fibers 242 and 238, respectively. Each conduit 266, 268, 272 and 274 comprises a tube 286 having a wall which defines the interior volume 282 thereof and concomitantly an interior volume of the conduit. To access the optical fibers within the conduits, the tubes 286 are broken as shown. Although conduits 268, 272 and 274 are shown as carrying a single fiber for ease of illustration, such conduits may carry a plurality of optical fibers. For example, conduit 266 in sensor cable segment 254 includes optical fibers 230 and 234 and conduit 270 in sensor cable segment 256 includes 246 and 250, however, such conduits may typically include about four fibers, as described further below in conjunction with FIG. 3. Moreover the principles of the disclosure do not implicate a particular number of optical fibers. Further, sensor cable segments 254, 256 may include other structures also described further below.

Ends 274 and 276 of sensor cable segments 254 and 256 may extend through outer shell 204 and into interior volume 202 of outer shell 204. Further, openings 278 and 280 in ends 274 and 276, respectively, may expose the interior volume 262 to the fluid, e.g., sea water, contained within interior volume 202 when sensor module 200 is deployed and allow the fluid to flood the interior volume 262.

Fluid admitted into the interior volumes of the sensor cable segments may flow into and flood interior volumes 282 of conduits 266, 268, 270, 272 and 274 via perforations, or vents, 284 in the tubes 286, and via broken ends 287. In this way, a pressure balanced configuration may be provided in which no pressure differential exists across tubes 286. Such vented tubes are more fully described in the commonly-owned, co-pending U.S. patent application Ser. No. 15/169,131) filed May 31, 2016, titled "Vented Optical Tube" (PGS-15129-US-ORG1), U.S. Patent Application Publication No. 2017/0038545 which is hereby incorporated by reference as if fully set forth herein.

Further, sensor cable segments 254 and 256 may be formed by severing a pre-fabricated length of sensor cable to gain access to the optical fibers contained therein to couple the fibers to a sensor module as described hereinabove. In such an embodiment, a portion of the continuous optical fibers in the pre-fabricated length of sensor cable may be used to connect to the sensor module. For example, optical fibers 230 and 234 may be severed segments of optical fibers 230A and 234A in conduit 270. To avoid wasting the remaining portions, optical fibers 230A, 234A, optical fiber extensions may be spliced onto optical fibers 230A, 234A. Thus, by way of example, optical fibers 246 and 250 may comprise such optical fiber extensions spliced onto optical fibers 234A and 230A, at splices 288 and 290, respectively.

Figure 2A:
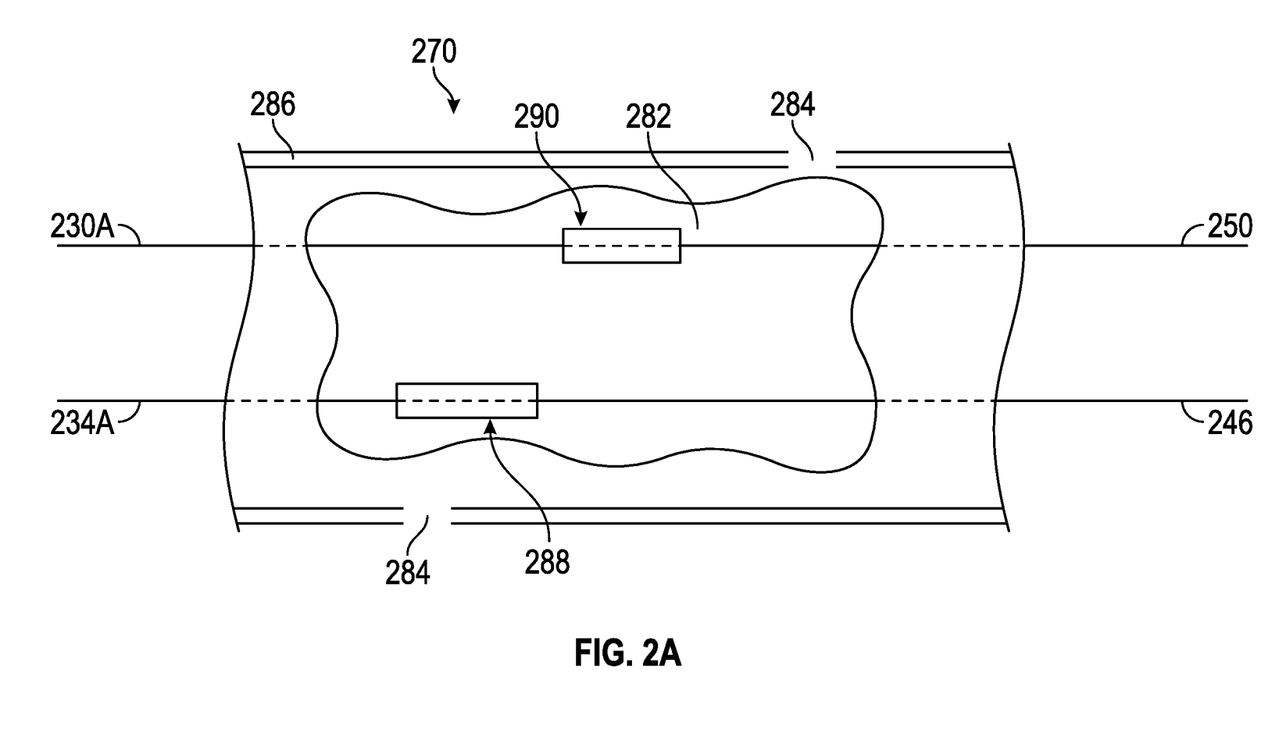
FIG. 2A shows a portion of the sensor module of FIG. 2 in accordance with at least some embodiments.

FIG. 2A shows a cutaway view of a section of conduit 270 to further illustrate splices 288 and 290. In particular, splices 288 and 290 have a spaced apart, or staggered, relationship in an axial direction along conduit 270. In other words, the splices have an axially spaced-apart relationship. In this way, a plurality of optical fiber splices may be accommodated within the confines of interior volume 282 of conduit 270. Recall too, that while two optical fibers are shown for ease of illustration, a conduit in a sensor cable may typically comprise more optical fibers, for example four of more such optical fibers. To further appreciate the foregoing, turn now to FIG. 3.

Figure 3:
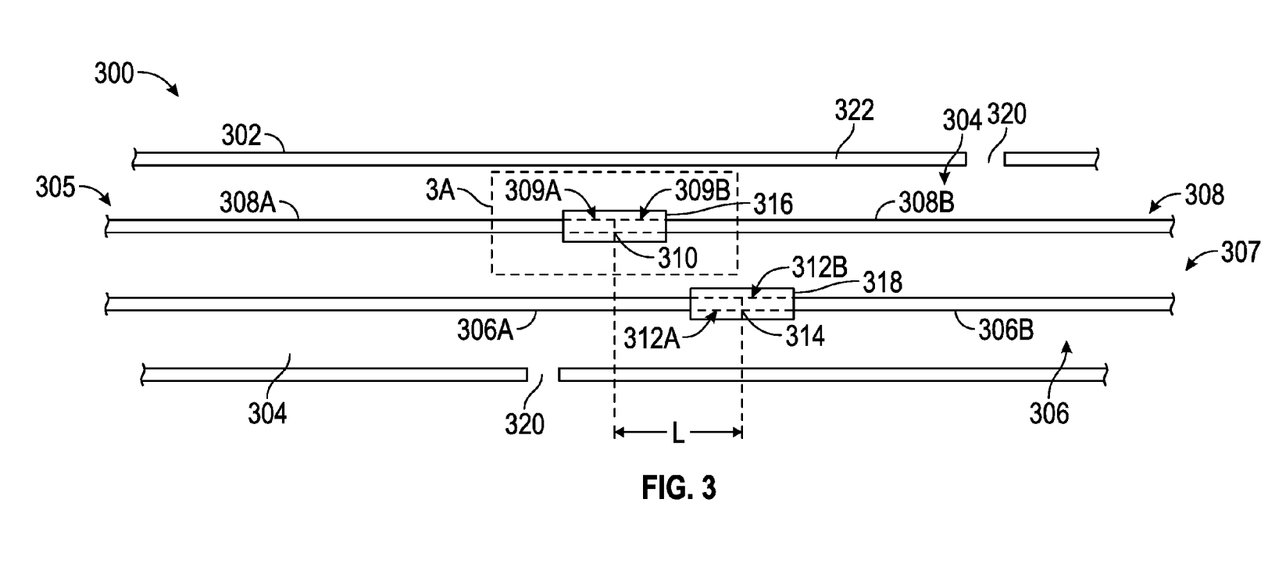
FIG. 3 shows a conduit in accordance with at least some embodiments.

FIG. 3 shows an axial cutaway section of a conduit 300, in accordance with at least some embodiments to illustrate the splicing of optical fibers in further detail. Conduit 300 may be an exemplary embodiment of a conduit 270 previously described. Conduit 300 includes a tube 302 defining an interior volume 304. In at least some embodiments, an area of a cross-section of the interior volume 304 is substantially uniform along a length of the tube 302, at least along the length disposed about the splices described further below. In at least some embodiments, the cross-sectional area may be based on a diameter of the interior volume of 2.0 millimeters or less. In at least some other embodiments, the cross-sectional area may be based on a diameter of 3 millimeters or less. Conduit 300 is, for ease of illustration, shown to be straight. However as described further below, conduit 300 may have a helical form in some embodiments. Stated otherwise, at least some embodiments of conduit 300 may comprise a helicoid. Optical fibers 306 and 308 may be disposed within interior volume 304 of conduit 300. As describe above, in general, conduit 300 may contain various numbers of optical fibers as may be constrained by the areal cross-section of the interior volume and the transverse dimensions of the optical fibers. Two optical fibers, each comprising two segments, are shown in FIG. 3 for ease of description, however various numbers of optical fibers may be contained therein.

Each of optical fibers 306 and 308 may comprise two segments 306A, 306B and 308A, 308B respectively. Optical fiber segments 306A and 308A extend from end 305 of conduit 300 to ends 309A and 312A of optical fiber segments 308A and 306A, respectively. Optical fiber segments 308B and 306B extend from respective ends 309B and 312B to an end 307 of conduit 300. End 309A abuts end 309B. Ends 309A and 309B may have a splice 310 therebetween, providing for coupling of optical power and/or optical signals between optical fiber segments 308A and 306B.

Figure 3A:
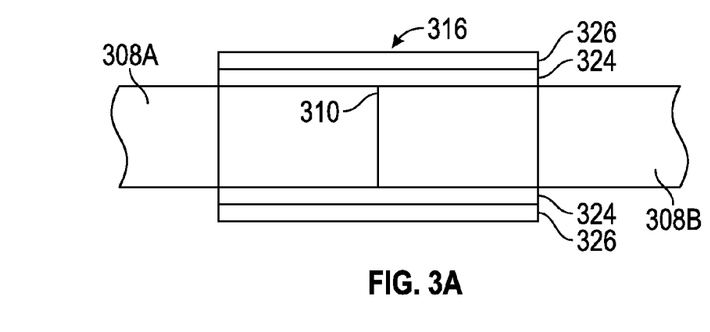
FIG. 3A shows a cross-sectional view of a portion of the conduit of FIG. 3 in accordance with at least some embodiments.

Splice 310 may, for example, be formed by melting of optical fiber segments 308A, B at the respective ends 309A, B and fusing ends 309A, B together. Such splices may be referred to as "fusion" splices. Similar to optical fiber 308, ends 312A and 312B of optical fiber segments 306A and 306B, respectively, may abut with a splice 314 therebetween. A sleeve 316 may be disposed about ends 309A, 309B and splice 310. Likewise a sleeve 318 may be disposed about ends 312A, B and splice 314. Sleeves 316 and 318 may be pinless sleeves, as described further below. In at least some embodiments, sleeves 316, 318 may have a length of about 3 centimeters. Sleeves 316 and 318 may provide structural support to splices 310 and 314, respectively. Sleeves 316 and 318 may be pinless. That is, sleeves 316, 318 may be without a pin of steel or other material used in related-art sleeves to reinforce splices in optical fibers. In at least some embodiments, sleeves 316 and 318 may comprise an inner layer of hot melt ethylene vinyl acetate (EVA) adhesive and an outer layer of irradiation cross-linked polyolefin heat shrinkable material, for example layers 324 and 326, FIG. 3A, respectively. Such a pinless sleeve may be, by way of example, a fusion splice protector sleeve, part number PS-SP-154, from FinishAdapt LLC, Morristown, Tenn., USA, and FinishAdapt Ltd., Swindon, UK.

It would be appreciated by those skilled in the art and having the benefit of this disclosure, that in practice, more than two splices may be employed in a segment of a sensor cable having a length on a typical range of 1 kilometer to 3 kilometers as described above. As previously described in conjunction with FIG. 2, to accommodate a multiplicity of splices in a substantially uniform cross-sectional area of the interior volume 304 of tube 302, splices 310 and 314 may be staggered in an axial direction. Stated differently, splices 310 and 314 may have a spaced-apart relationship in the axial direction, denoted by the stagger length L, in FIG. 3. Exemplary stagger lengths, L may be in the range of between about 3 centimeters (cm) to 50 cm.

Further, as described hereinabove, in operation a sensor cable comprising one or more conduits such as conduit 300 may be configured to admit a fluid such as sea water into interior volume 304 thereof. The fluid may be admitted, for example, by ingress through perforations, or vents 320 in wall 322 of tube 302 and/or the ends of the conduit. Staggering the positions of the splices may also serve to accommodate the flow of fluid throughout the interior volume 304, and in particular to accommodate the flow of liquid axially along tube 302.

Figure 4:
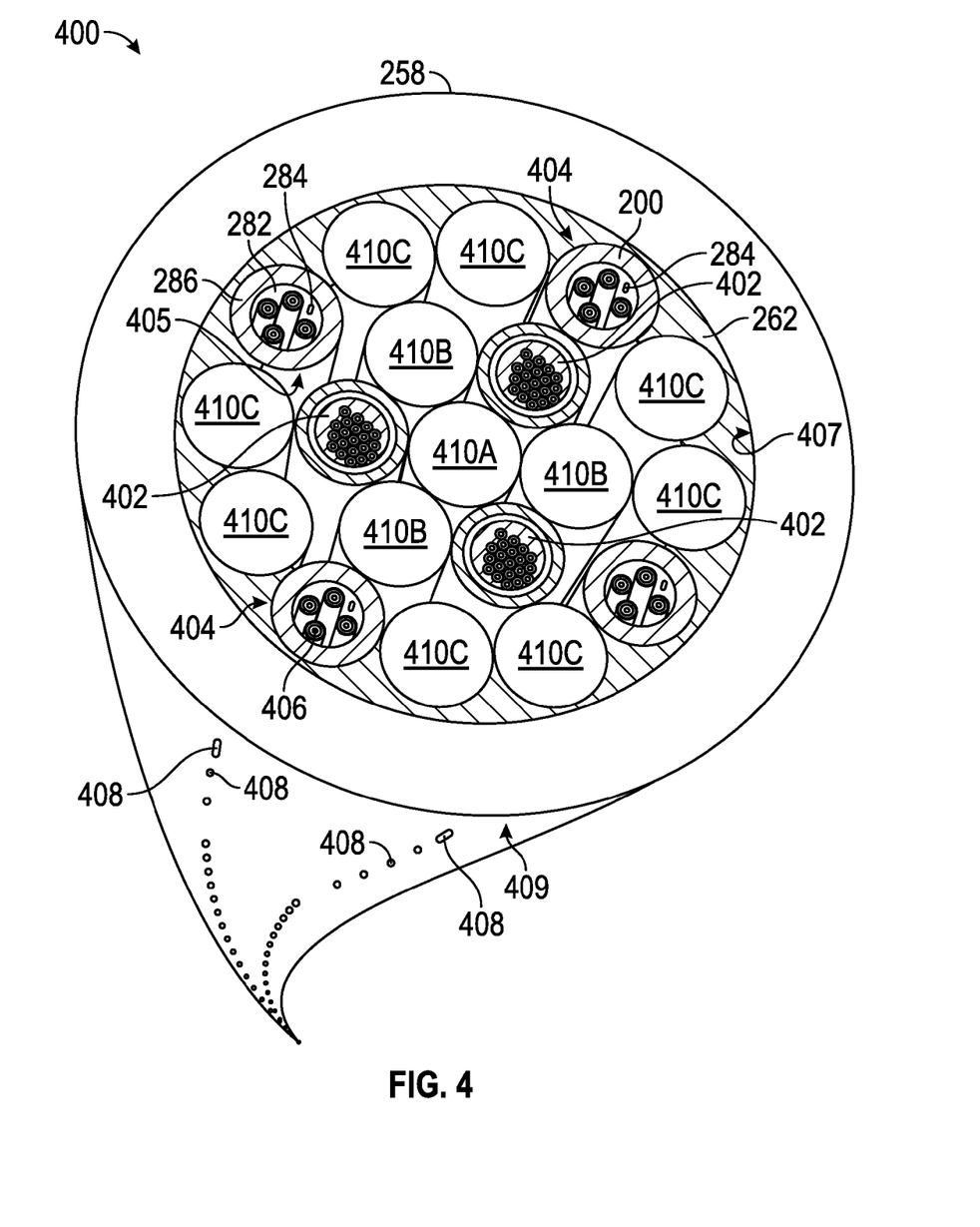
FIG. 4 shows a sensor cable in accordance with at least some embodiments.

As set forth above, in a sensor cable, the conduits bearing the optical fibers may not be straight but may be in the form of a helicoid. To further appreciate the arrangement of the conduits and other structures which may be included in a sensor cable turn to FIG. 4 showing a sensor cable 400 in accordance with at least some embodiments. Sensor cable 400 may be exemplary of embodiments of sensor cable used in subsea environments and exemplary of sensor cable segments 254, 256 (FIG. 2B). Sensor cable 400 also includes, disposed within interior volume 262 strength members 410. Strength members 410 may comprise, for example, galvanized steel wire, however any suitable wire or strand materials that provide adequate design strengths may be used. In the example sensor cable 400, disposed about a central strength member 410A are three strength members 410B intertwined with three sealed optical fiber conduits 402. Disposed about the intertwined strength members 410B and sealed optical fiber conduits 402 are four floodable optical fiber conduits 404, and strength members 4100. Floodable optical fiber conduits 404 include four optical fibers 406 disposed within an interior volume 282 and tube 286 defining interior volume 282. Tubes 286 may also be referred to as "loose tubes." Tubes 286 may have, in at least some embodiments, an inner diameter of about 2 millimeters and an outer diameter of about 3 millimeters. Although four optical fibers are shown by way of example, other numbers of optical fibers may be enclosed in a tube 286.

Tubes 286 comprise a wall including vents 284 passing between an outer surface 405 and interior volume 282. Vents 284 allow for the ingress of a fluid into interior volume 282 as described above. Tubes 286 may comprise a plastic material, e.g. polypropylene or polyvinylidene fluoride (PVDF), or a metal such as stainless steel or other non-corrosive metal, e.g. brass. Exemplary materials suitable for tubes 286 are described in the commonly-owned, co-pending U.S. Patent Publication No. 2015/0234143 titled Subsea Cable Having Floodable Optical Conduit" which is hereby incorporated by reference as if fully reproduced herein. Floodable optical fiber conduits 404 may be exemplary of conduits 266, 268, 270, 272 and 274. Outer jacket 258 comprises inner surface 407 and an outer surface 409, and defines an interior volume 262 bounded by inner surface 407. Further, perforations, or vents, 408 may also be provided in the outer jacket 258, which vents pass between the outer surface 409 and the inner surface 407 to the interior volume 262. The vents 408 provide for fluid communication between a water body and interior volume 262 and allow for the ingress of a fluid such as sea water into the interior volume 262. Thus, in addition to fluid entering interior volume 262 via ends of sensor cable segments as described above, in at least some embodiments a fluid such as sea water may be admitted through vents 408. Further, as a sensor cable 400 is deployed in the sea say, sea water may either compress or displace any gas, such as air, entrained in interior volume 262 and expel it through other vents 408. Likewise, the sea water may flow through vents 284 in tubes 286 into interior volume 282 thereof thereby flooding floodable conduits 404 and compressing or displacing any entrained gas, e.g. air, which may be also be expelled through other vents 284. Thus, a pressure-balanced configuration for the sensor cable segment may be realized.

Figure 5:
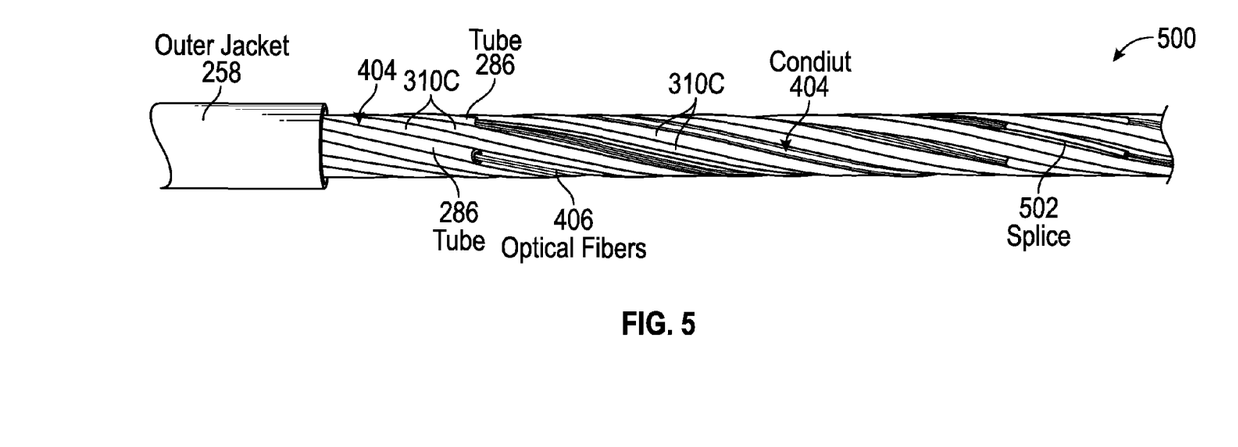
FIG. 5 shows a sensor cable in accordance with at least some embodiments.

To further appreciate the disposition of the various structures within a sensor cable 400, turn to FIG. 5 showing a view of a cutaway sensor cable 500. Sensor cable 500 may illustrate an exemplary embodiment of a sensor cable segment 256 or 254 (FIG. 2B). In FIG. 5, outer jacket 258 is shown cutaway to expose structures within sensor cable 500 including strength members 3100 and floodable optical fiber conduits 404. Further, in FIG. 5 it is seen that in at least some embodiments of a sensor cable in accordance with the exemplary sensor cable 400, the strength members and conduits are helically wound within the interior volume (not visible in FIG. 5) of the sensor cable such that the form of floodable optical fiber conduits 404 comprises a helicoid. Tubes 286 comprise cut tubes as described above to gain access to the optical fibers 406 therein. By exposing the optical fibers 406 in this way a splice 502 between one of optical fibers 406 and second optical fiber or extension (not shown in FIG. 5) may be made, as previously described. Further, splices to join multiple optical fibers within a particular conduit to extensions may be staggered in accordance with at least some embodiments, also described above.

Figure 6:
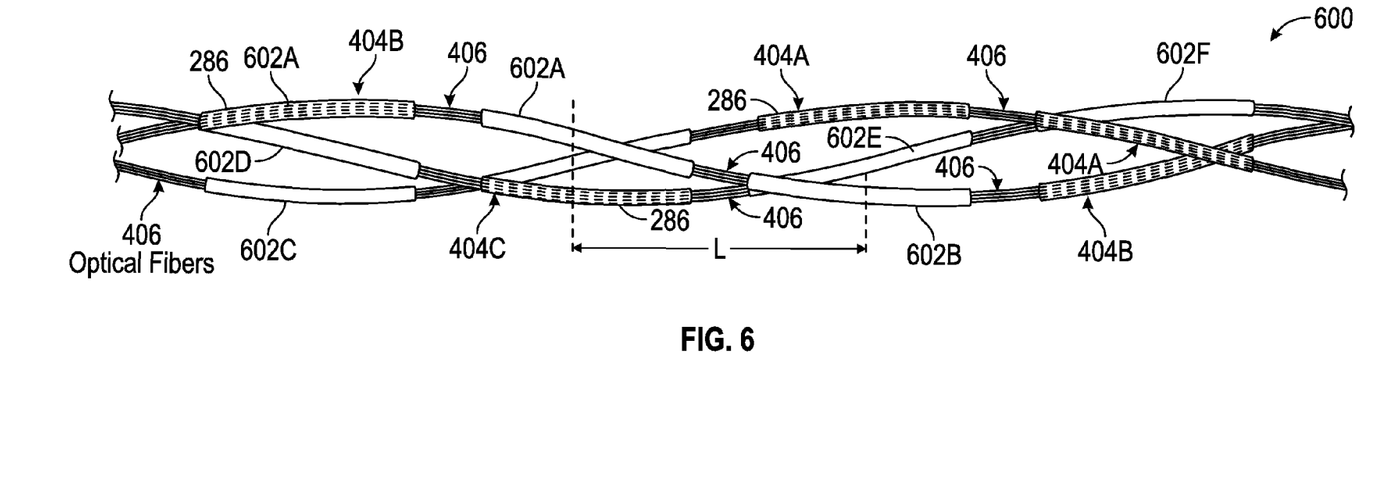
FIG. 6 shows a plurality of conduits in accordance with at least some embodiments.

To further appreciate the foregoing, turn to FIG. 6 which shows three sets 600 of conduits 404 in a context of the helical form of the conduits as shown in FIGS. 4 and 5. Other structures that may be included in a sensor cable as described above are not shown in FIG. 6 for ease of illustration. In FIG. 6, portions of the tubes 286 included in conduits 404A, 404B, 404C have been removed to show splices 602 disposed in a staggered relationship along a length of each conduit 404. Thus, for example, splices 602A and 602B which splice optical fibers within conduit 404B have a staggered length, L, or offset, therebetween. In other words, each of the splices is a different respective distance from a cross-section passing through the spliced fibers. In this way, multiple splices may be provided within the confines of the interior volume of a particular conduit. Stated otherwise, a diameter of the interior volume (not shown in FIG. 6) of a tube 286 may be smaller than the combined diameters of the spliced fibers. In other words, the inside diameter of a tube 286 may be smaller than the combined width of two splices set axially side-by-side. For example, in at least some embodiments, a tube 286 may have inner diameter less than 3 millimeters. It would be appreciated by those skilled in the art and having the benefit of the disclosure that the width of a splice includes any support structure, such as a sleeve or splice protector used in conjunction with the splice. By way of example, if a sleeve, as previously described, is used in conjunction with splices 602, a diameter of the sleeve may be greater than one-half the diameter of the interior volume of the tube 286. In at least some embodiments, a pinless sleeve when fixed about a splice may have a diameter of between about 1.4 and 1.5 millimeters. Splices can be staggered along a length of a single optical fiber and/or along respective lengths of two or more optical fibers. In other words, splices staggered along a length of a single spliced optical fiber can join multiple optical fibers to form a contiguous spliced optical fiber, or one of the staggered splices can join a pair of optical fibers, for example, to form one contiguous spliced optical fiber and another staggered splice can join another pair of optical fibers, distinct from the first pair, to form a second contiguous spliced optical fiber. However, with respect to splices that are disposed within different tubes, splices 602C and 602D for example, the axial positions of the splices may overlap, as shown. Further, where splices and the optical fibers joined thereby have been exposed by removal of the tube containing the fibers, for example splices 602E, F, the tube may be restored as described in the commonly-owned, co-pending U.S. patent application Ser. No. 15/169,146, filed May 31, 2016, titled "Tube Reattachment" (PGS-15131-US-ORG1), U.S. Patent Application Publication No. 2017/0038533, which is hereby incorporated by reference as if fully set forth herein.

Figure 7:
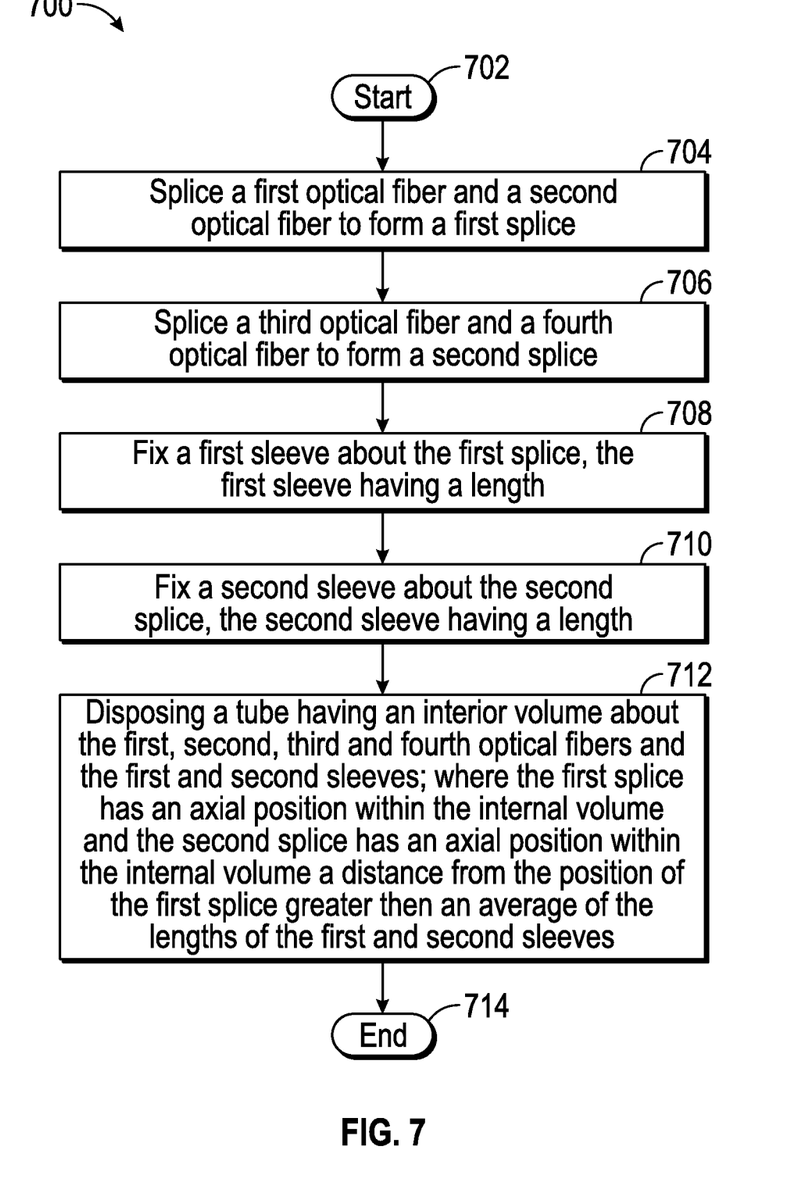
FIG. 7 shows a flowchart of a method in accordance with at least some embodiments.

FIG. 7 shows a flowchart of a method 700 in accordance with at least some embodiments. Method 700 starts at block 702. In block 704, first and second optical fibers are spliced to form a first splice. And, third and fourth optical fibers are spliced to form a second splice, block 706. The first and second splices may be fusion splices as described above. A first sleeve, having a length, is fixed about the first splice, at block 708. The first sleeve may be fixed, for example by disposing the first splice protector over the first splice and applying heat to shrink the sleeve about the splice. Further, in at least some embodiments, the first sleeve may be a pinless sleeve. At block 710, a second sleeve having a length is fixed about the second splice. The second sleeve may be fixed similarly to the first sleeve. Note that the lengths of the first and second sleeves may, but need not, be the same. The second sleeve may also be a pinless sleeve. A tube having an interior volume is disposed about the first, second third and fourth optical fibers and the first and second sleeves, block 712. The first splice has an axial position within the interior volume and the second splice has an axial position within the interior volume a distance from the position of the first splice greater than an average of the lengths of the first and second sleeves. Method 700 ends at block 714.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor cable may include various numbers of strength members, floodable optical fiber conduits and sealed optical fiber conduits. And each floodable optical fiber conduit may include various numbers of optical fibers. By way of another example, while the principles of the disclosure have been described in conjunction with pinless splice protectors, splice protectors employing a pin may also be used. It is intended that the following claims be interpreted to embrace all such variations and modifications.

What is claimed is:

1. An apparatus comprising:
   a tube having a wall defining an interior volume;
   first and second optical fibers disposed within the interior volume, the first and second optical fibers joined at a first splice; and
   third and fourth optical fibers disposed within the interior volume, the third and fourth optical fibers joined at a second splice, wherein the first splice and the second splice have an axially spaced-apart relationship within the interior volume of the tube;
   wherein the interior volume has a diameter less than a combined width of the first splice and the second splice when set axially side-by-side.

2. The apparatus of claim 1 wherein the spaced-apart relationship of the first and second splices comprises a stagger length equal to or greater than about 3 centimeters.

3. The apparatus of claim 1 further comprising a sleeve disposed about each of the first and second splice.

4. The apparatus of claim 3 wherein a diameter of the sleeve is greater than one-half the diameter of the interior volume.

5. The apparatus of claim 1 wherein the tube comprises a metal.

6. The apparatus of claim 5 wherein the metal comprises a non-corrosive metal.

7. The apparatus of claim 6 wherein the non-corrosive metal comprises stainless steel.

8. The apparatus of claim 1 wherein the tube comprises a plastic.

9. A cable comprising:
   an outer jacket having a wall defining an interior volume of the outer jacket;
   a tube having a wall defining an interior volume of the tube, the tube disposed within the interior volume of the outer jacket;
   a first optical fiber disposed within the interior volume of the tube and a second optical fiber disposed within the interior volume of the tube, the first and second optical fibers joined at a first splice;
   a third optical fiber disposed within the interior volume of the tube and fourth optical fiber disposed within the interior volume of the tube, the third and fourth optical fibers joined at a second splice; and
   wherein the first splice and the second splice have an axially spaced-apart relationship within the interior volume of the tube;
   wherein the wall of the tube comprises a plurality of vents passing from an outer surface of the wall to the interior volume of the tube, the plurality of vents disposed along a length of the tube, and wherein each vent of the plurality of vents is configured to be in fluid communication with the interior volume of the outer jacket.

10. The cable of claim 9 wherein the interior volume of the outer jacket is configured to be in fluid communication with a water body.

11. The cable of claim 9 further comprising a central strength member disposed within the interior volume of the outer jacket and wherein the tube comprises a helicoid disposed about the central strength member.

12. The cable of claim 9 wherein the interior volume of the tube has a substantially uniform cross-sectional area along a length of the tube enclosing the first and second splices.

13. The cable of claim 12 wherein the cross-sectional area is based on a diameter of the interior volume of 2.0 millimeters or less.

14. The method of claim 9 wherein the length of each sleeve is about 3 centimeters.

15. A method comprising:
   splicing a first optical fiber and a second optical fiber to form a first splice;
   splicing a third optical fiber and a fourth optical fiber to form a second splice;
   fixing a first sleeve about the first splice;
   fixing a second sleeve about the second splice, the first and second sleeves each having a length;
   disposing a tube having an interior volume about the first, second, third and fourth optical fibers and the first and second sleeves; and wherein the first splice has an axial position within the interior volume and the second splice has an axial position within the interior volume a distance from the axial position of the first splice greater than an average of the lengths of the first and second sleeves;
   wherein the interior volume of the tube has a diameter less than a combined width of the first and second sleeves set axially side-by-side.

16. The method of claim 15 wherein:
   the interior volume of the tube has a cross-sectional area based on the diameter; and
   the cross-sectional area is substantially uniform along a length of the tube disposed about the first and second sleeves.

17. The method of claim 15 wherein:
   at least one of the first and second sleeves comprises a pinless sleeve; and
   the first and second splices comprise fusion splices.

* * * * *